W. Steele.
Making Staves.
No. 2,427. Reissued Dec. 18, 1866.
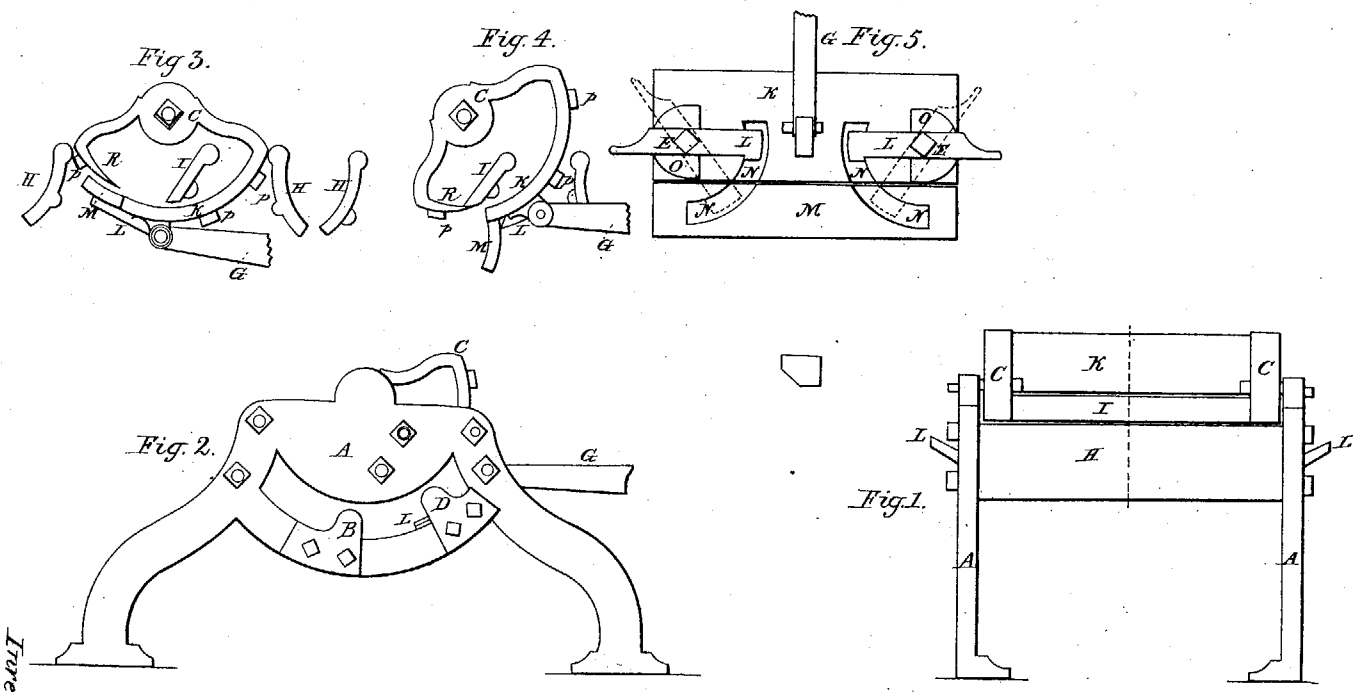
Witnesses.
Edwd Humphrey
P. M. Barry
Inventor:
Wm. Steele
AM. PHOTO-LITHO. CO. N.Y. (OSBORNE'S PROCESS)

United States Patent Office.

IMPROVEMENT IN MACHINES FOR CUTTING STAVES.

W. STEELE, OF WHEELING, WEST VIRGINIA.

*Letters Patent No.* 21,856, *dated October* 19, 1858; *reissue No.* 2,427, *dated December* 18, 1866.

The Schedule referred to in these Letters Patent and making part of the same.

TO ALL WHOM IT MAY CONCERN:

Be it known that I, WILLIAM STEELE, of the city of Wheeling, in the county of Ohio, and State of Virginia, now West Virginia, have invented sundry new and useful Improvements in Machines for Cutting Staves, &c., from steamed or other wood; and I do hereby declare that the following is a full and exact description of the construction and operation of the same, reference being had to the annexed drawings, making a part of this specification, and to the letters of reference marked thereon, like parts being designated by like letters in the several figures.

The nature of my invention consists in certain combinations and arrangement of parts in such manner that with or without a hinged bed-plate (held under or back of the knife) to support the bolt of wood whilst a piece is being separated from it; that in either case, after the stave, shingle, or other piece has been cut from said bolt or block, that it will be automatically discharged, or drop from the machine during the return motion of the knife.

The object of my invention in either formation of the bed-piece is to secure a good clean cut, or prevent any tendency to check or split the bolt or block of wood during the process of cutting. In the drawings—

Figure 1 represents a front elevation of my machine.

Figure 2 an end view.

Figures 3 and 4 are transverse sections; and

Figure 5 is a reversed view of the bed-plate, with the apron, levers, and pitman attached.

The frame of my machine consists in the upright end pieces A A, confined together by the cross-ties H H and I. The working part consists in the curved metallic frames C C, to which are attached the bed-plate K and knife R, and secured by the bolts *p p p*. The frames C C are secured to the uprights A A by the pivots *f f*, on which said frames hang, thereby giving the bed K and the knife R a curved motion corresponding to the desired shape of the stave; motion being imparted by the pitman G, which is attached to the under side of the bed. The apron M is hinged to the bed K in such a manner that it forms a part of the said bed, and passes under the knife R, so as to prevent the piece from curling or turning away from the knife when it is being separated from the bolt or block. The levers L L are secured to enlargements O O on the ends of the bed K by the bolts E E, which act as pivots, on which said levers turn. One end of said levers passes out through a curved slot in the upright A A, the other end rests on the enlargement N N on the bed K and the apron M. As the machine is moved back preparatory to making the cut, the outer ends of the levers come in contact with the stops B, which causes them to turn on the bolts E E, and as the bed moves on the inner ends of said levers come in contact with the apron M, and raise it to the position shown by fig. 3; the levers there pass under the apron and support it in that position, as shown by dotted lines on fig. 5. A block is then placed on the bed K, between the cross-ties I and the knife R, the bed being the desired thickness of the stave below the knife; as the machine is moved forward the knife comes in contact with the block, and separates a piece from it; the piece passing between the apron and the knife is supported by the apron until it is entirely separated from the block. The outer ends of the levers then come in contact with the stops D, and the inner ends are moved back and the apron swings down on its hinges so as to let the piece drop from the knife, as shown at fig. 4, and so alternately each successive cut. The bed K can be extended further forward, so as to dispense entirely with the hinged apron M, its levers, L, &c.; this without affecting the good working of the machine, which can be operated by any usual or well-known power.

Having thus described my invention, what I claim as new, and desire to secure by Letters Patent of the United States, is—

1. The swinging frame composed of the pieces C C, bed-plate K, and knife R, in combination with cross-tie I, constructed and operated in the manner substantially as shown and described, and for the purpose set forth.

2. The apron M hinged to the bed-plate K, as described, or otherwise attached to the machine in such a manner that it can be held under or back of the knife, to support the piece during the process of cutting, and then swing down or fall back to allow the piece to drop from the knife.

The combination of the levers L L and stops B and D, or their equivalents, as described.

W. STEELE.

Witnesses:

S. S. FAHNESTOCK,

JOHN S. HOLLINGSHEAD.